(12) United States Patent
Herdendorf et al.

(10) Patent No.: US 11,545,181 B2
(45) Date of Patent: Jan. 3, 2023

(54) ROTATING RAMP WITH RETRACTION CAPABILITY FOR A DISK DRIVE

(71) Applicant: Seagate Technology LLC, Fremont, CA (US)

(72) Inventors: Brett R. Herdendorf, Mound, MN (US); Riyan Alex Mendonsa, Minneapolis, MN (US); Krishnan Subramanian, Shakopee, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 17/196,192

(22) Filed: Mar. 9, 2021

(65) Prior Publication Data
US 2022/0293131 A1 Sep. 15, 2022

(51) Int. Cl.
*G11B 21/02* (2006.01)
*G11B 17/02* (2006.01)

(52) U.S. Cl.
CPC .............. *G11B 17/02* (2013.01); *G11B 21/02* (2013.01)

(58) Field of Classification Search
None
See application file for complete search history.

(56) References Cited

U.S. PATENT DOCUMENTS

| | | | |
|---|---|---|---|
| 5,764,437 A | 6/1998 | Meyer et al. | |
| 5,995,332 A * | 11/1999 | Patterson | G11B 5/54 |
| 6,115,214 A | 9/2000 | Allsup et al. | |
| 6,480,361 B1 | 11/2002 | Patterson | |
| 7,672,083 B1 | 3/2010 | Yu et al. | |
| 7,697,238 B2 * | 4/2010 | Makoto | G11B 5/54 |
| | | | 360/254.3 |
| 9,536,552 B1 | 1/2017 | Chen et al. | |
| 11,094,347 B1 * | 8/2021 | Herdendorf | G11B 21/24 |
| 2007/0008653 A1 | 1/2007 | Ohno et al. | |

* cited by examiner

*Primary Examiner* — K. Wong
(74) *Attorney, Agent, or Firm* — Holzer Patel Drennan

(57) ABSTRACT

A data storage system include a disk drive having a rotating ramp assembly that may be moved between an engaged and disengaged position. The rotating ramp assembly may include a ramp extension that is not disposed in overlapping relation to a data storage disk location in the drive when in the disengaged position. However, in the engaged position, the ramp extension may overhang a portion of the data storage disk location. In turn, the head extension may include a ramp surface that allows a head assembly to move to a head parking surface when the rotating ramp assembly is in the engaged position. IN turn, the rotating ramp assembly may be rotated while maintaining the head assembly on the head parking surface, which may be arcuate and extend about at least a portion of the rotating ramp assembly.

22 Claims, 14 Drawing Sheets

ROTATING RAMP WITH RETRACTION CAPABILITY FOR A DISK DRIVE

BACKGROUND

Hard disk drives are commonly used in computer systems to facilitate storage of large amounts of data. Such hard disk drives utilize magnetic media typically$_{comprising}$ rotating data storage disks. One or more read/write heads comprising a head assembly may be provided that may be moved relative to the rotating data storage disks to facilitate reading data from and writing data to the data storage disks. The head assembly is typically supported by an actuator arm that may be moved relative to the rotating data storage disks to access different tracks on the data storage disks. The heads may be supported above the rotating magnetic disks by the actuator arm on an air bearing at a distance referred to as a flying height during normal operation when the heads are reading data from and writing data to data tracks on the data storage disks.

However, it may be necessary to move the head assembly away from the data storage disks. The magnetic disk material and the head assembly may comprise sensitive materials crucial to proper operation of the disk drive. As such, operations may occur in which the head assembly may be moved away from the magnetic disks for various reasons such as during initial manufacturing of the drive, for protection of the head and/or magnetic disks, during idle times of the drive, or for other reasons. In any regard, ramps have been traditionally provided that provide a gradual transition between the flying height of the head assembly above the rotating data storage disks and a park location of the heads away from the disks. Such ramps typically overhang a portion of the outer diameter of the disks to provide a transition between the flying height of the head assembly and the park location.

SUMMARY

In view of the foregoing, it has been recognized that current designs for ramps in disk drives suffer from a number of drawbacks. For instance, as some ramp designs require a portion of the ramp to overhang a portion of the outer diameter of the rotating data storage disks, some portion of the surface area of the magnetic disks may be obstructed by the ramp. In turn, a number of otherwise accessible data tracks near the outer diameter of the data storage disks may be obscured by the ramp and become non-usable. As the ramp covers the outer diameter of the disk, the amount of surface area obstructed is relatively high because the obstructed surface area represented by the overhung portion of the disk is at the outer portion of the disk at which the data tracks are the longest. Furthermore, to the extent that ramps have been proposed that retract from an overhung relationship to the magnetic disk, such designs may not be sufficiently compact to allow for packaging within a housing of a disk drive while maintaining necessary dimensional constraints for the housing of the disk drive. This is particularly relevant in view of efforts to continuously reduce the size and/or footprint area of drives.

In turn, the present disclosure presents a ramp assembly that facilitates a compact design and improves on the spatial utilization within a drive housing. Specifically, the ramp assembly may be rotatable such that actuation of the ramp between an engaged position and a disengaged position relative to the disks may be accomplished in a relatively small spatial envelop and with reduced actuation forces.

Moreover, the ramp provided herein may have an arcuate parking surface to support a head assembly in a parked position while the ramp undergoes movement between the engaged and the disengaged positions. This may allow a disk merge operation to be performed in which the disk media may be removed and/or installed in the drive while the head assembly is parked, and the ramp is retracted from the disk media.

Accordingly, the present disclosure generally describes a disk drive data storage system. The system includes a data storage disk location having an outer diameter. A rotatable ramp assembly is provided that is rotatable about a ramp assembly axis between an engaged position and a disengaged position relative to the data storage disk location. A ramp extension extends tangentially from the rotatable ramp assembly and includes a ramp surface. The ramp extension extends from the rotatable ramp assembly beyond the outer diameter (e.g., in a direction toward the rotational axis of the data storage disk location) to dispose the ramp surface in overlying relation relative to the data storage disk location when the rotatable ramp assembly is in the engaged position. In addition, the ramp extension may be disposed without extending beyond the outer diameter such that the ramp surface is in non-overlying relation relative to the data storage disk location when the rotatable ramp assembly is in the disengaged position. The system also includes a head parking surface extending annularly about at least a portion of the rotatable ramp assembly to supportively engage a head assembly of the disk storage drive during rotation between the engaged position and the disengaged position.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
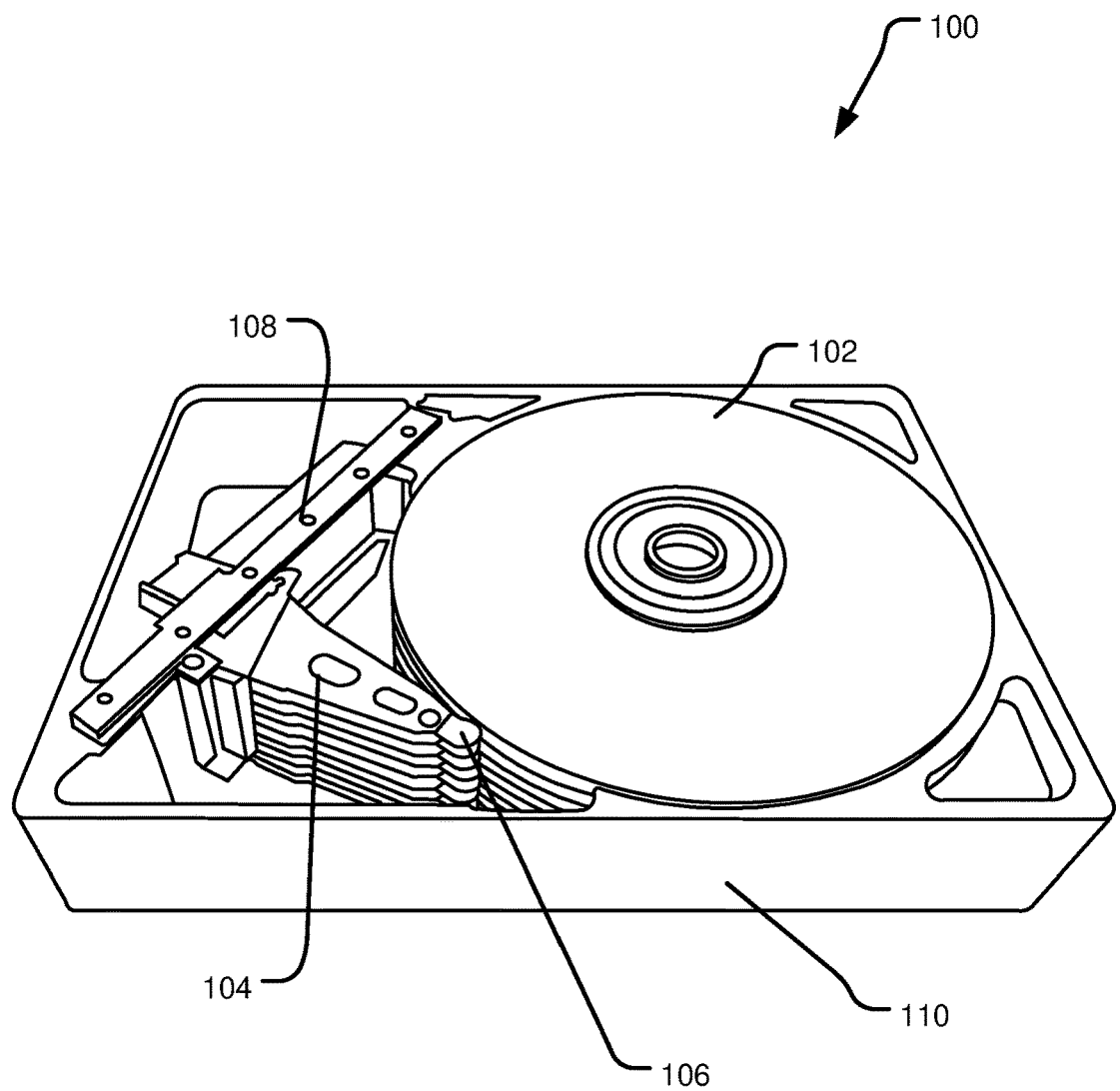
FIG. 1 depicts an example disk drive assembly with a cover removed showing data storage disks in relation to a zero skew head assembly actuator.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope of the invention as defined by the claims.

FIG. 1 illustrates an example disk drive 100. The disk drive 100 may include one or more data storage disks 102 that comprise magnetic storage media. The data storage disks 102 are typically concentrically arranged in multiple levels of disk media that all rotate about a common rotational axis. The rotation of the data storage disks 102 may be controlled by an actuator or motor. The disk drive 100 also includes a head assembly actuator arm 104 that supportably engages a head assembly 106 that may include one or more read heads and/or one or more write heads for reading data from and writing data to the data storage disks 102. The head assembly actuator arm 104 may be controlled a voice coil motor or other actuator that may move the head assembly 106 at the distal end of the head assembly actuator assembly arm 104. In this regard, the head assembly 106 may be selectively positioned relative to the data storage disks 102 to position the head assembly 106 relative to different tracks of the data storage disks 102.

In one example of the drive 100, the head assembly actuator arm 104 may be engaged a linear actuator 108 for linear movement of the head assembly 106 relative to the data storage disks 102. Thus, the linear movement of the head assembly 106 using the linear actuator 108 may provide a reduced skew or zero skew design relative to a skew angle of the head assembly 106 relative to a data track on the data storage disk 102. One such example of a zero skew arrangement is described in U.S. patent application Ser. No. 17/223,447 titled "DATA STORAGE DEVICE LINEAR ACTUATOR" filed on 6 Apr. 2021 However, other examples of actuators may be used including traditional voice coil motors and an actuator arm to position the head assembly 106 relative to the data storage disk 102 without limitation.

As briefly discussed above, it may be advantageous to move the head assembly 106 into a parked position in which the head assembly 106 is disposed outside of an outer diameter of a data storage disk location occupied by the data storage disks 102 in FIG. 1. For instance, such a parked position may allow the disk drive 100 to be assembled through introduction of the data storage disks 102 into a housing 110 or the like. Moreover, it may be advantageous to provide the head assembly 106 in a parked position during a mechanical disruption (e.g., a vibrational condition experienced by the disk drive 100) or in idle times as means of protection of the head assembly 106 and or data storage disks 102. During normal operation, the head assembly 106 may be located relative to the data storage disks 102 offset from a surface of the data storage disks 102 by a flying distance from the surface of the data storage disks 102. The head assembly 106 may be at least partially supported by an air bearing created upon high-speed rotation of the data storage disks 102. In order to allow the disk drive 100 to be idled and stop the spinning of the data storage disks 102, upon a mechanical disruption, or for any other appropriate reason, the head assembly 106 may be moved away from the data storage disks 102 to a parked position as described above.

To facilitate movement of the head assembly 106 across the boundary at the outer diameter of the data storage disks 102, ramps have been traditionally used that provide a transition between the flying height of the head assembly 106 and a parked position for safely parking the head assembly 106 at a location away from the data storage disk location of the drive. In order to provide a smooth transition for the head assembly 106, such ramps have traditionally overhung the outer diameter of the data storage disks 102. That is, the ramp extends towards the interior of the data storage disks 102 a distance that spans the outer diameter of the data storage disks 102. This presents several disadvantages. Notably, as the ramp overhangs the data storage disk 102, the tracks of the data storage disks 102 near the outer diameter may be obscured by the ramp, preventing the head assembly 106 from accessing these tracks near the outer diameter of the data storage disk 102. This limits the storage capacity of the data storage disks 102. As the obscured tracks of the data storage disk 102 may be near the outer diameter, the loss of such tracks may constitute a loss of 5% or more of the total storage capacity of the disk drive 100.

Furthermore, having a ramp overhang the outer diameter of the data storage disks 102 may also complicate loading and/or unloading of data storage disks 102 from a drive housing 110. Whether for operational purposes, during manufacturing, or for other reasons, it may be necessary to load and/or unload data storage disks 102 from the housing 110 of the disk drive 100. If a ramp overhangs the outer diameter of a data storage disk location, the data storage disks 102 may not be introduced to or removed from the housing 110 along an axis about which the data storage disks 102 rotate, which complicates the loading and/or unloading processes.

Thus, it has been proposed to have actuated or moveable ramps that allow a ramp to be advanced and/or retracted from an overhung position relative to the data storage disks 102. However, such a proposed ramp design suffers from drawbacks as well. For instance, the physical envelope within the housing 110 available for the ramp may be limited, which precludes some retractable ramp designs. In addition, movement of a ramp between an engaged position and a disengaged position may not be possible while a head assembly 106 is parked away from the data storage disks 102. Thus, for example, prior approaches to use of retractable ramps require a ramp to be maintained in the engaged position while the head assembly 106 is parked, which precludes the benefit of the retracted position while loading and unloading.

Figure 2:
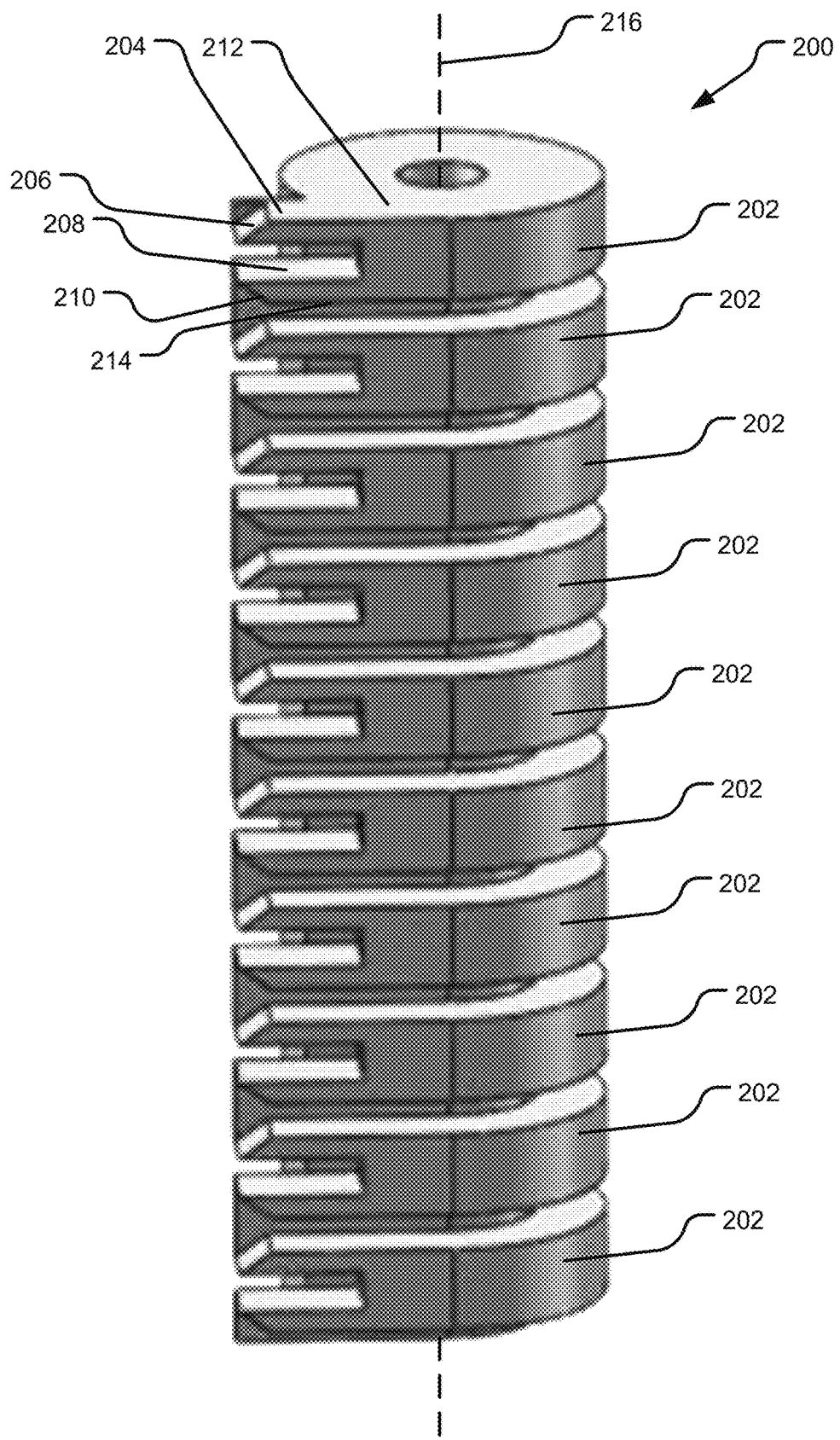
FIG. 2 depicts an example of a rotatable ramp assembly.

Accordingly, an example of a rotatable ramp assembly 200 is provided as shown in FIG. 2. The rotatable ramp assembly 200 may facilitate a number of benefits relative to traditional static overhung ramps and/or prior proposed retractable ramp solutions. While such benefits may be further appreciated with reference to the continued discussion below, the design of the rotatable ramp assembly 200 may generally provide a compact design that may be accommodated within a housing 110 of a disk drive 100 without requiring additional space to accommodate movement of the rotatable ramp assembly 200 between an engaged and a disengaged position. Thus, the size of a disk drive 100 incorporating the rotating ramp assembly 200 may be reduced.

Moreover, the rotating ramp assembly 200 may facilitate movement of the rotating ramp assembly 200 between an engaged position and a disengaged position while maintaining a head assembly 106 in a parked position beyond the outer diameter of the data storage disk location of a disk drive 100 (e.g., in a direction away from the rotating axis of the data storage disk location of the drive). Accordingly, whether during manufacture or to facilitate unloading, loading, and/or merging of data storage disks 102 from a drive, the head assembly 106 of a drive may be maintained in a parked position while the rotating ramp assembly 200 is moved into a disengaged position as will be illustrated in greater detail below.

As shown in FIG. 2, the rotating ramp assembly 200 may include a ramp body 202. A dedicated ramp body 202 may be provided for each of a plurality of data storage disks of a disk drive that may be provided as a stack. The ramp body 202 may generally comprise a circular configuration that extends about a ramp assembly axis 216 about which the rotating ramp assembly 200 may be rotated. The rotating ramp assembly 200 may include a ramp extension 204 that may extend tangentially from the rotatable ramp assembly. By extending tangentially from the ramp body 202, the ramp extension 204 may be selectively positioned to extend beyond an outer diameter of a data storage disk location of a drive as described in greater detail below. The ramp extension 204 may feature an upper ramp surface 206 along which a head assembly may be directed to provide a transition between a flying height of the head assembly and an upper head parking surface 212.

While the ramp body 202 is generally depicted as having a circular configuration, other potential shapes of the ramp body 202 may be provided. For example, other shape variations (e.g., including polygonal shapes, ovoid shapes, or other shapes) may be used in which the ramp extension 204 extends from the ramp body 202 for selective movement of the ramp extension 204 between a non-overlapping orientation relative to an outer diameter of a data storage disk location in a disengaged position and an overlapping orientation relative to the outer diameter of the data storage disk location.

The ramp extension 204 may include a disk notch 208 that may receive a data storage disk when the ramp assembly 200 is rotated into an engaged position relative to the data storage disk. As data storage disks may have head assemblies on either side of a disk, the ramp extension 204 may also include a lower ramp surface 210 and a lower head parking surface 214. As can be appreciated, disk drives may include a stack of data storage disks that are concentrically disposed along an axis of rotation of the data storage disks. Thus, it may be appreciated that the rotating ramp assembly 200 may include a plurality of ramp bodies 202 that each include an upper ramp surface 206 and upper head parking surface 212 as well as a lower ramp surface 210 and a lower head parking surface 214. Thus, while such features are not marked with reference numerals in FIG. 2, it may be appreciated that any appropriate number (e.g., a corresponding number) of ramp bodies 202 may be provided for each data storage disk in a disk drive.

Figure 3:
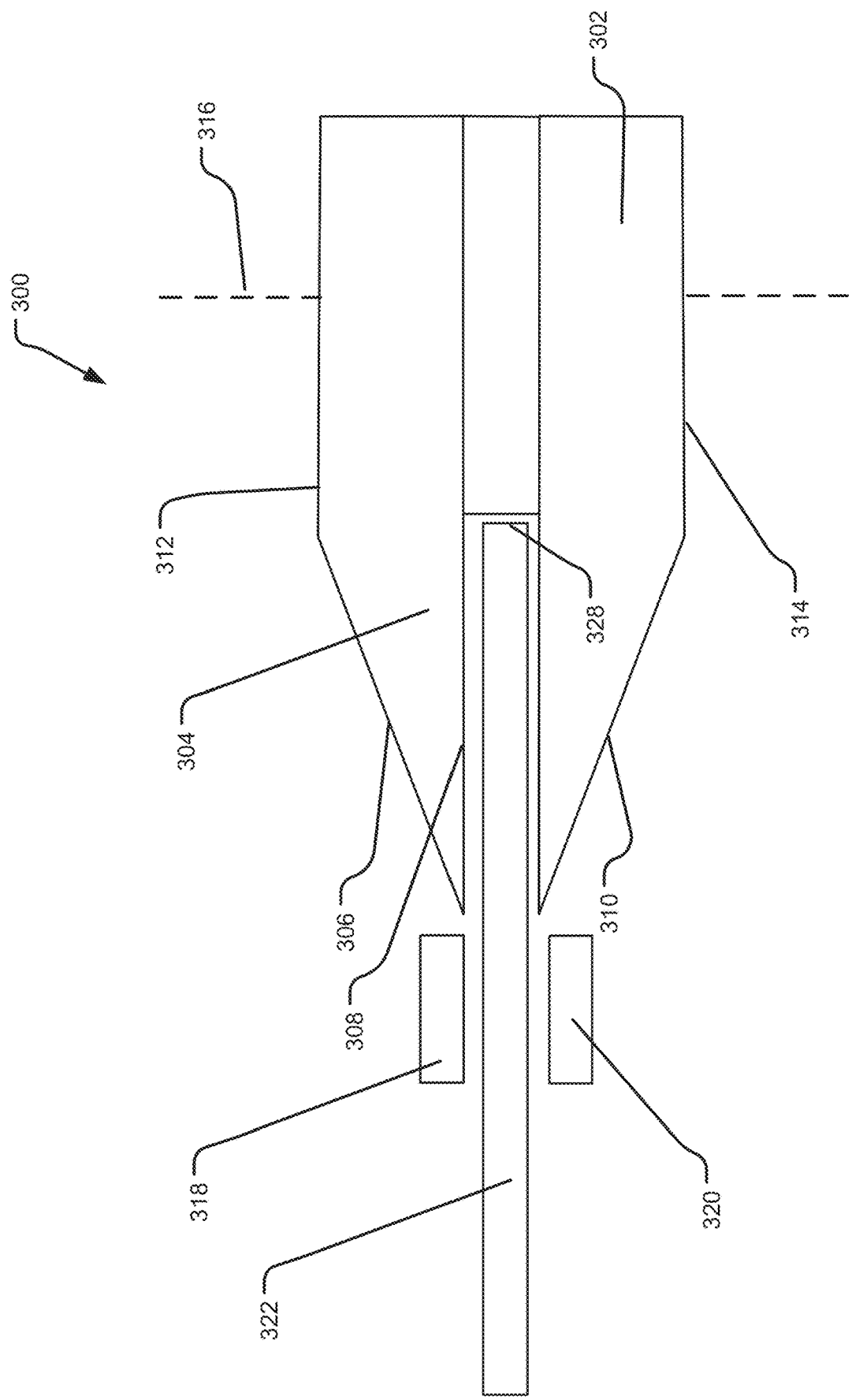
FIG. 3 depicts a partial side view of an example of a data storage disk with head assemblies disposed relative to a rotatable ramp assembly in an engaged position.

With further reference to FIG. 3, a side view of a ramp body 302 of a rotatable ramp assembly 300 is shown in relation to a data storage disk 322. As can be appreciated, the ramp body 302 includes a ramp extension 304 that is disposed in an engaged position such that an upper ramp surface 306 and a lower ramp surface 310 extend beyond an outer diameter 328 of the data storage disk 322. In turn, an upper head assembly 318 may be disposed adjacent to the upper ramp surface 306 and a lower head assembly 320 may be disposed near the lower ramp surface 310.

Figure 4:
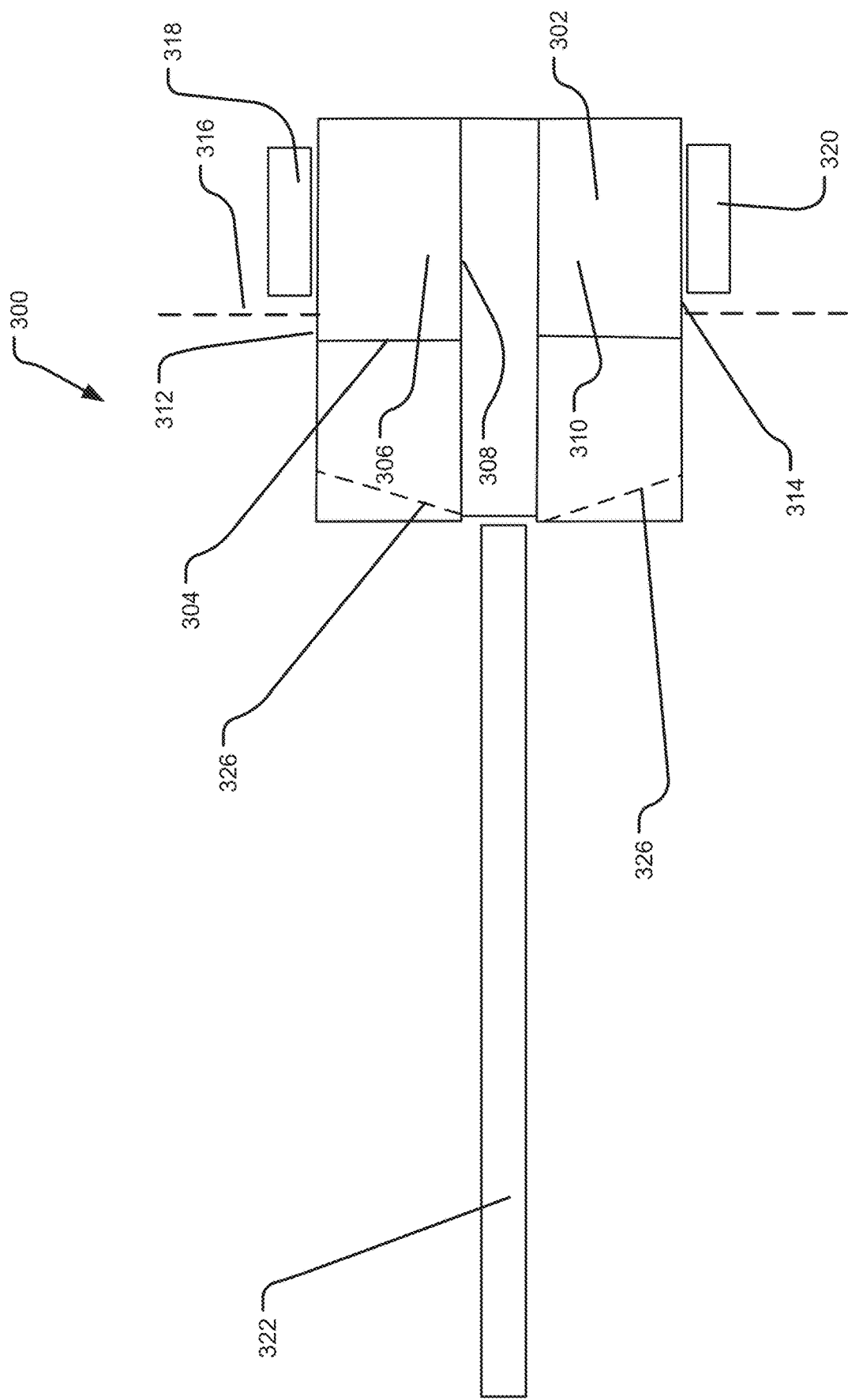
FIG. 4 depicts a partial side view of an example of a data storage disk with head assemblies in a parked position relative to a rotatable ramp assembly in a disengaged position.

With further reference to FIG. 4, the upper head assembly 318 may be moved up the upper ramp surface 306 to an upper head parking surface 312 and the lower head assembly 320 may be moved up the lower ramp surface 310 to a lower head parking surface 312. Also shown in FIG. 4, the rotatable ramp assembly 300 may be rotated about a ramp assembly axis 316 such that the ramp extension 304 no longer overhangs the outer diameter 328 of the data storage disk 322. As will be explained in greater detail below, the upper head assembly 318 and the lower head assembly 320 may be maintained at the upper head parking surface 312 and the lower head parking surface 314, respectively while the rotatable ramp assembly 300 is moved between the engaged position shown in FIG. 3 and the disengaged position shown in FIG. 4. With the ramp extension 304 in the disengaged position, it may be appreciated that no portion of the rotatable ramp assembly 300 may overhang the data storage disk 322.

Figure 5:
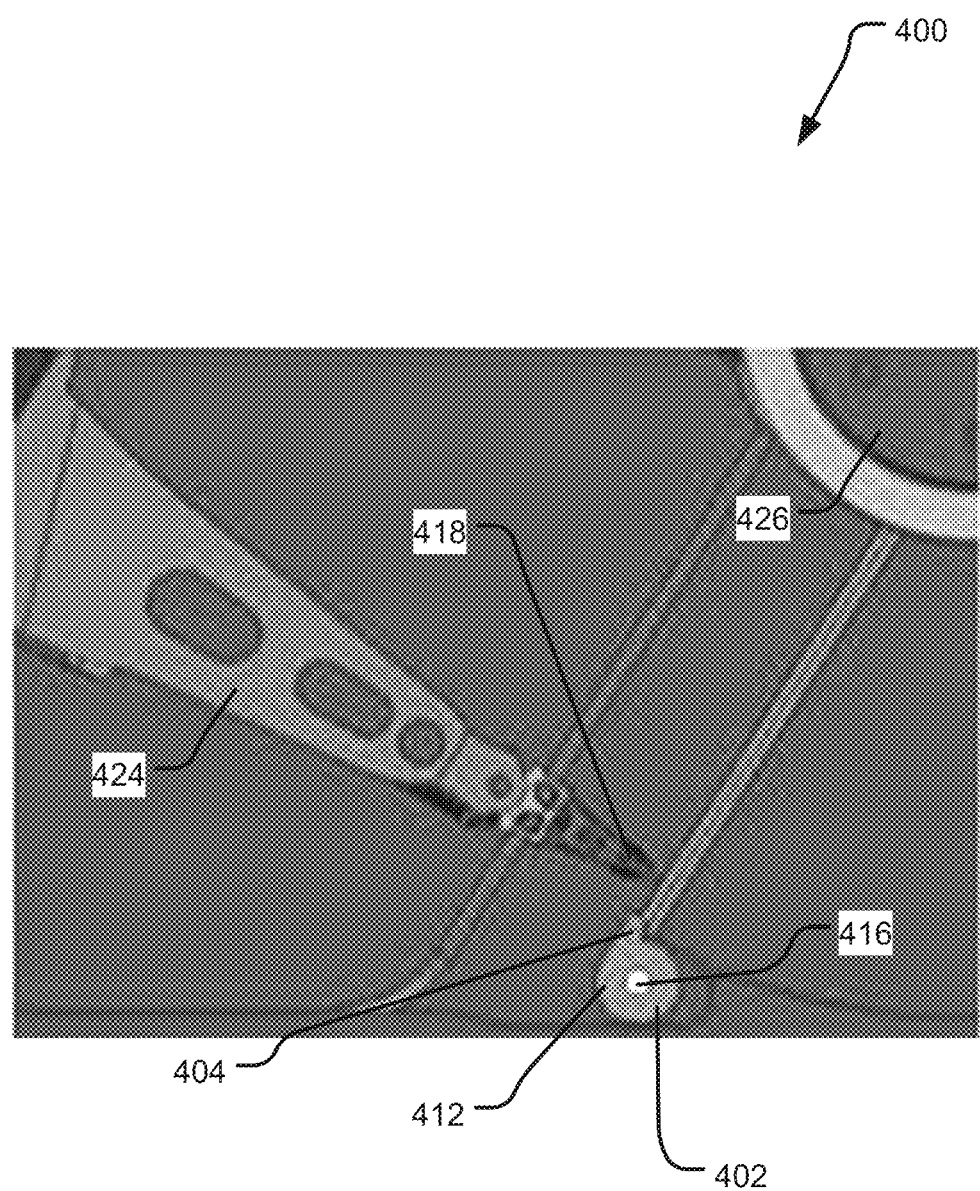
FIG. 5 depicts a top view of an example of a rotatable ramp assembly in an engaged position for parking of a head assembly on the rotatable ramp assembly prior to a parking operation.
Figure 6:
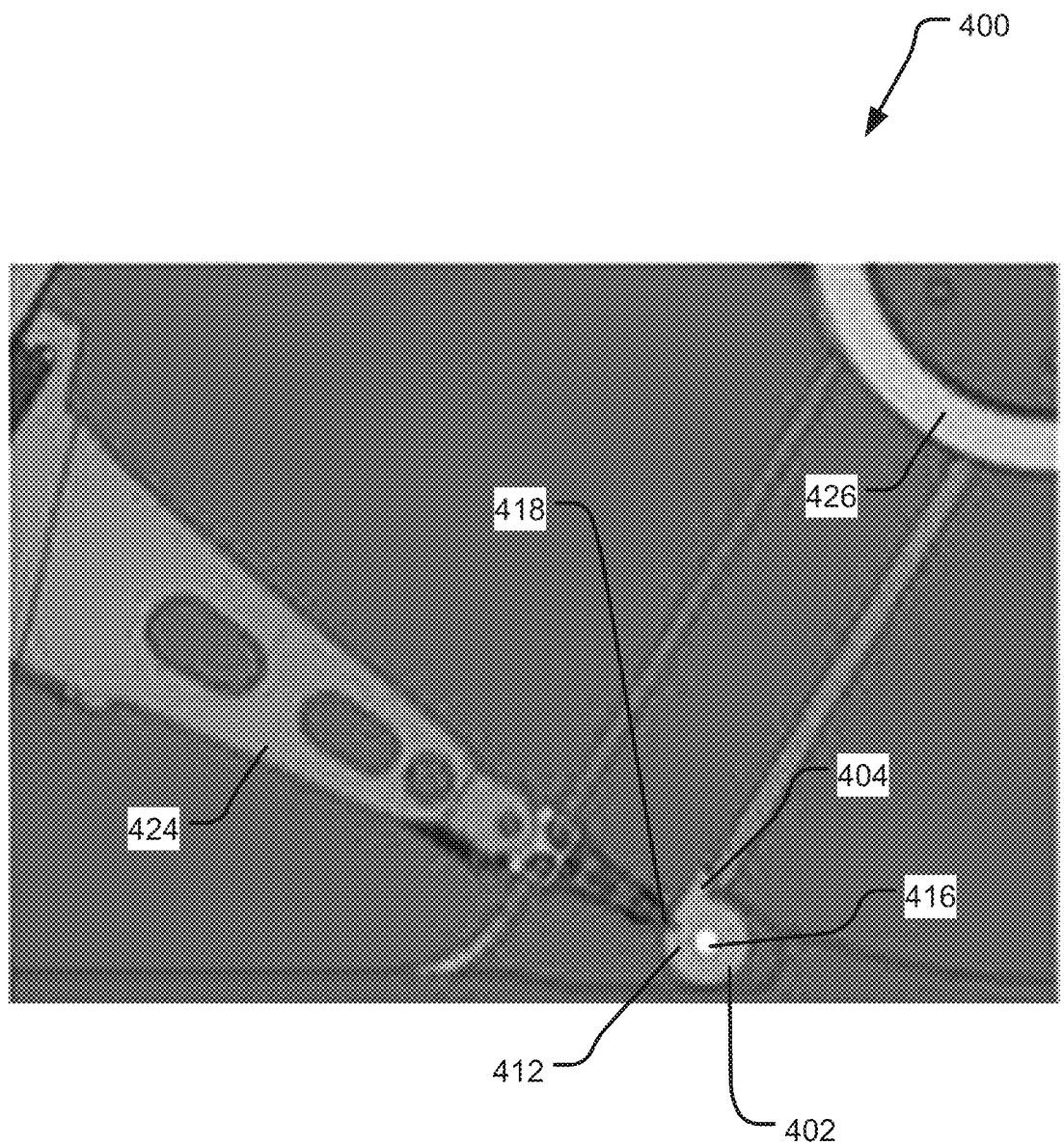
FIG. 6 depicts a top view of an example of a rotatable ramp assembly in an engaged position with a head assembly disposed in a parked position on a head parking surface.

Accordingly, with further reference to FIGS. 5-13, use of an example of a rotatable ramp assembly 400 is shown from a top view illustrating a parking operation, loading/unloading of data storage disks, and deployment of a head assembly from a parked position. In FIG. 5, the rotatable ramp assembly 400 is in an engaged position relative to a data storage disk location. That is, a ramp extension 404 is in a configuration that would overhand data storage disks that were installed on a spindle 426 of the disk drive, even though no data storage disks are installed in the illustrated state of FIG. 5. Alternatively, prior to installation of the data storage disks, when the head assembly 418 is not on the ramp assembly 400, there may be a comb (not shown) facilitating the separation of the head assemblies 418 until the head assemblies 418 may be moved to the ramp assembly 400. FIG. 5 also shows a head assembly actuator arm 424 supporting a head assembly 418. As can be appreciated, the head assembly 418 is maintained by the head assembly actuator arm 424 in a deployed position. The illustrated state of FIG. 5 may occur after unloading of data storage disks from a disk drive or upon initial manufacture of the disk drive prior to installation of data storage disks. In any regard, in FIG. 6, the head assembly 418 may be moved by the head assembly actuator arm 424 such that the head assembly 418 moves up a ramp surface of the ramp extension 404 in the engaged position to reside on the head parking surface 412.

Figure 7:
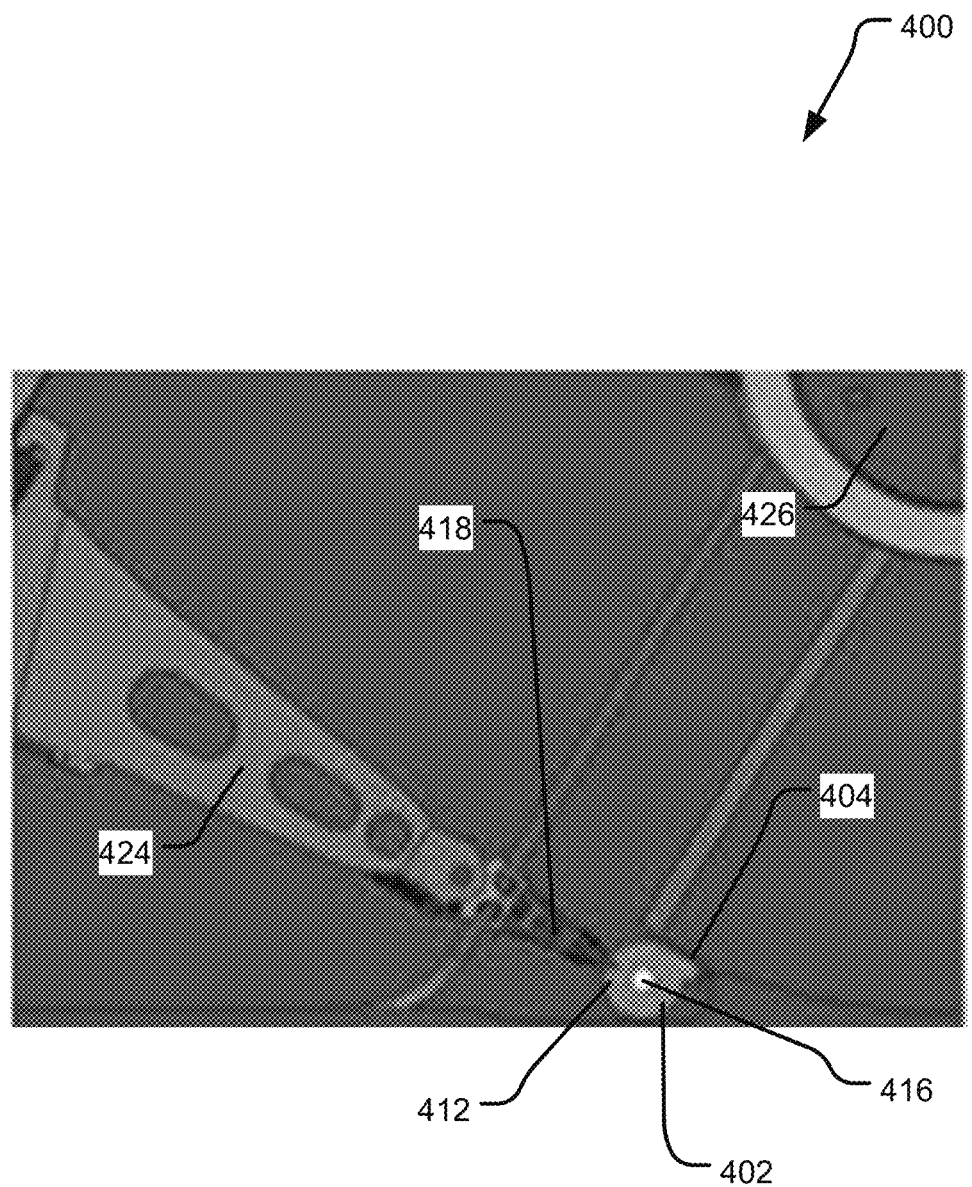
FIG. 7 depicts a top view of an example of a rotatable ramp assembly having been moved to a disengaged position with a head assembly disposed in a parked position on a head parking surface.

With further reference to FIG. 7, the rotatable ramp assembly 400 may be rotated about the ramp assembly axis 416 to a disengaged position. The head assembly 418 may be maintained on an arcuate shape of the head parking surface 412 such that the head assembly 418 remains stationary, but in position on the head parking surface 412 as the rotatable ramp assembly 400 is rotated about the ramp assembly axis 416. In the disengaged position, the ramp extension 404 that extends tangentially from the rotatable ramp assembly 400 is disposed such that the ramp extension 404 does not overhang an outer diameter of a data storage disk location. In the event a comb is provided to separate the head assemblies 418, the comb may be removed after the head assembly 418 is moved to the parked position shown in FIG. 7.

Figure 8:
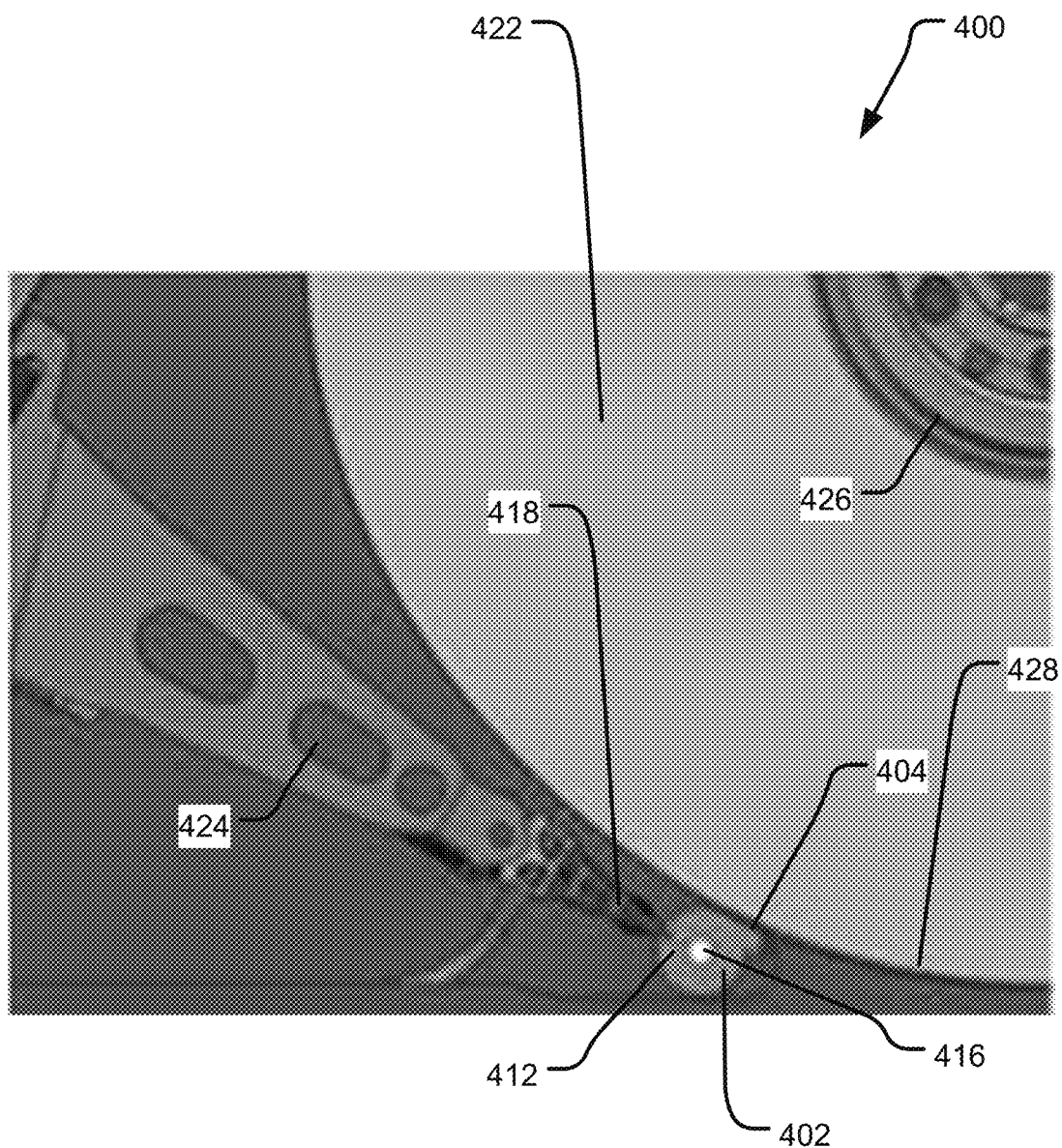
FIG. 8 depicts a top view of an example of a rotatable ramp assembly having been moved to a disengaged position with a head assembly disposed in a parked position on a head parking surface and data storage disks having been installed to the disk drive.

As such, with further reference to FIG. 8, one or more data storage disks 422 may be loaded into the disk drive by engaging the spindle 426. As can be appreciated in FIG. 8, as the rotatable ramp assembly 400 is in a disengaged position, the ramp extension 404 does not provide interference to the data storage disks 422 when advanced along an axis of rotation of the data storage disks 422 defined by the spindle 426. That is, the ramp extension 404 does not extend beyond the outer diameter 428 of the data storage disk 422 such that the data storage disks may be loaded or unloaded from the disk drive when the rotatable ramp assembly is in the disengaged position.

Figure 9:
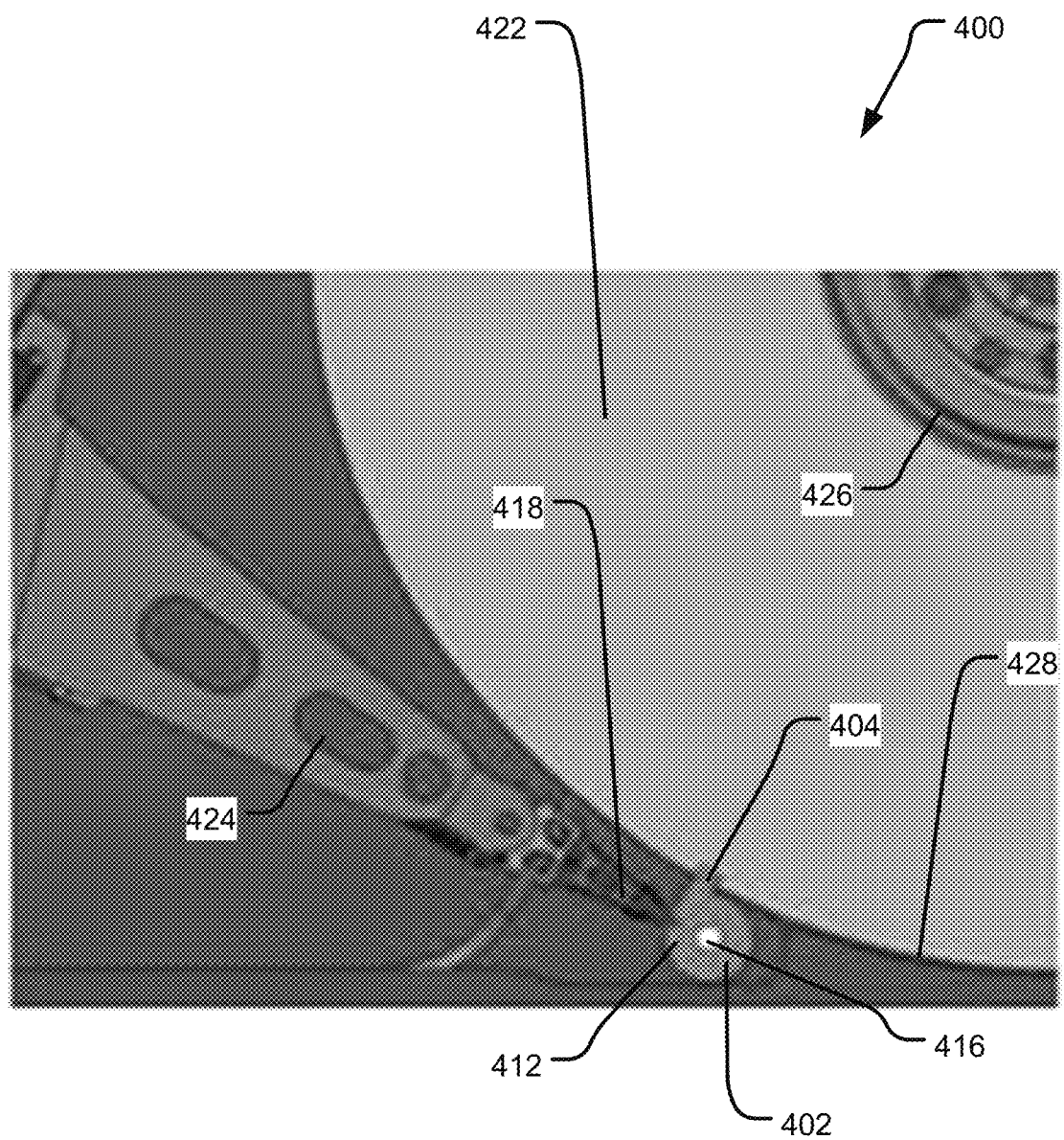
FIG. 9 depicts a top view of an example of a rotatable ramp assembly having been moved to an engaged position relative to installed data storage disks.

With further reference to FIG. 9, once the data storage disks 422 have been loaded into the disk drive to engage the spindle 426, the rotatable ramp assembly 400 may be rotated into an engaged position to dispose the ramp extension 404 having a ramp surface beyond the outer diameter 438 of the data storage disk 422. As such, the head assembly 418 may be moved from the head parking surface 412 into position relative to the data storage disk 422.

Figure 10:
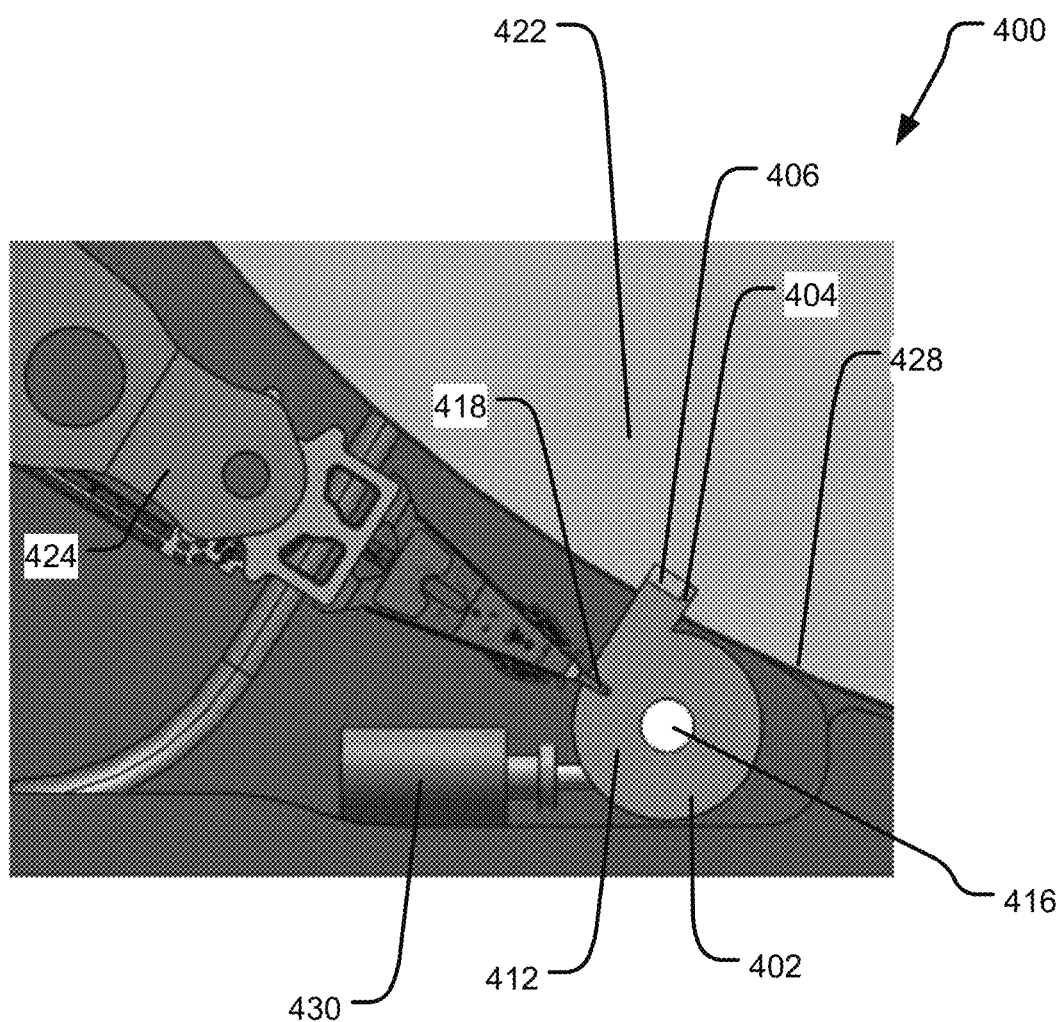
FIG. 10 depicts a top view of an example of a rotatable ramp assembly with actuator having been moved to an engaged position relative to installed data storage disks.

FIG. 10 also shows the rotatable ramp assembly 400 in an engaged position such that the ramp extension 404 is disposed beyond the outer diameter 428 of the data storage disk 422. In addition, FIG. 10 depicts an actuator 430 that is engaged with the rotatable ramp assembly 400 to move the rotatable ramp assembly 400 between the engaged position and the disengaged position. The actuator 430 may be any appropriate actuator that is engaged with the rotatable ramp assembly 400 to impart rotation of the rotatable ramp assembly 400. Examples of potential, but not limiting, actuators include a shape memory alloy actuator, a motor, a solenoid, bimetallic material actuator, or the like. As will be described in greater detail below, it may be advantageous to provide rapid actuation of the rotatable ramp assembly 400 between the disengaged and engaged positions (e.g., in the case of an emergency park operation or the like). However, in other contexts, a more reliable, potentially slower actuation of the rotatable ramp assembly 400 between the disengaged and engaged positions may also be desirable for increased longevity and controllability of the movement. In this regard, it may be that separate actuation mechanisms may be provided for regular movement between the engaged and disengaged positions and emergency movements.

Figure 11:
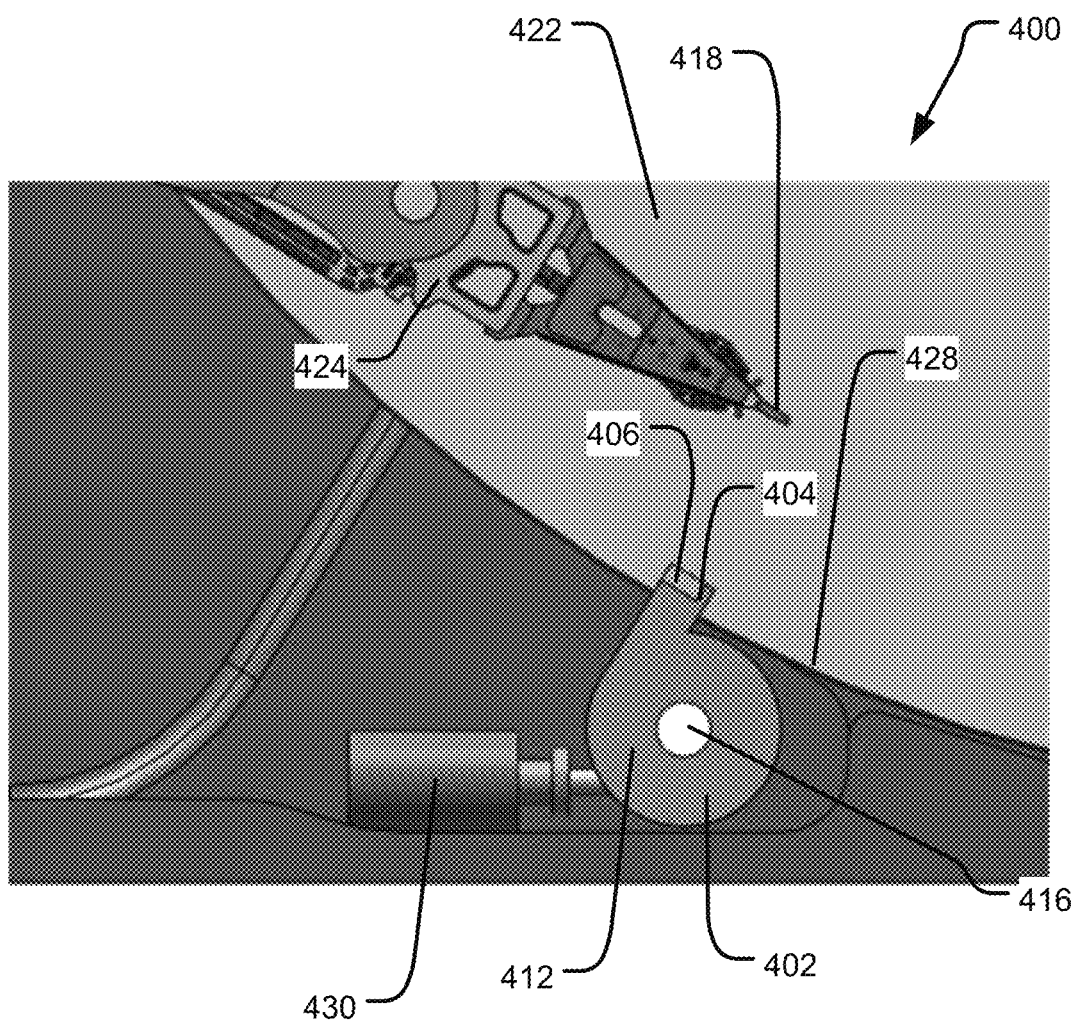
FIG. 11 depicts a top view of an example of a rotatable ramp assembly with actuator having been moved to an engaged position relative to installed data storage disks for movement of a head assembly into position relative to the data storage disks.
Figure 12:
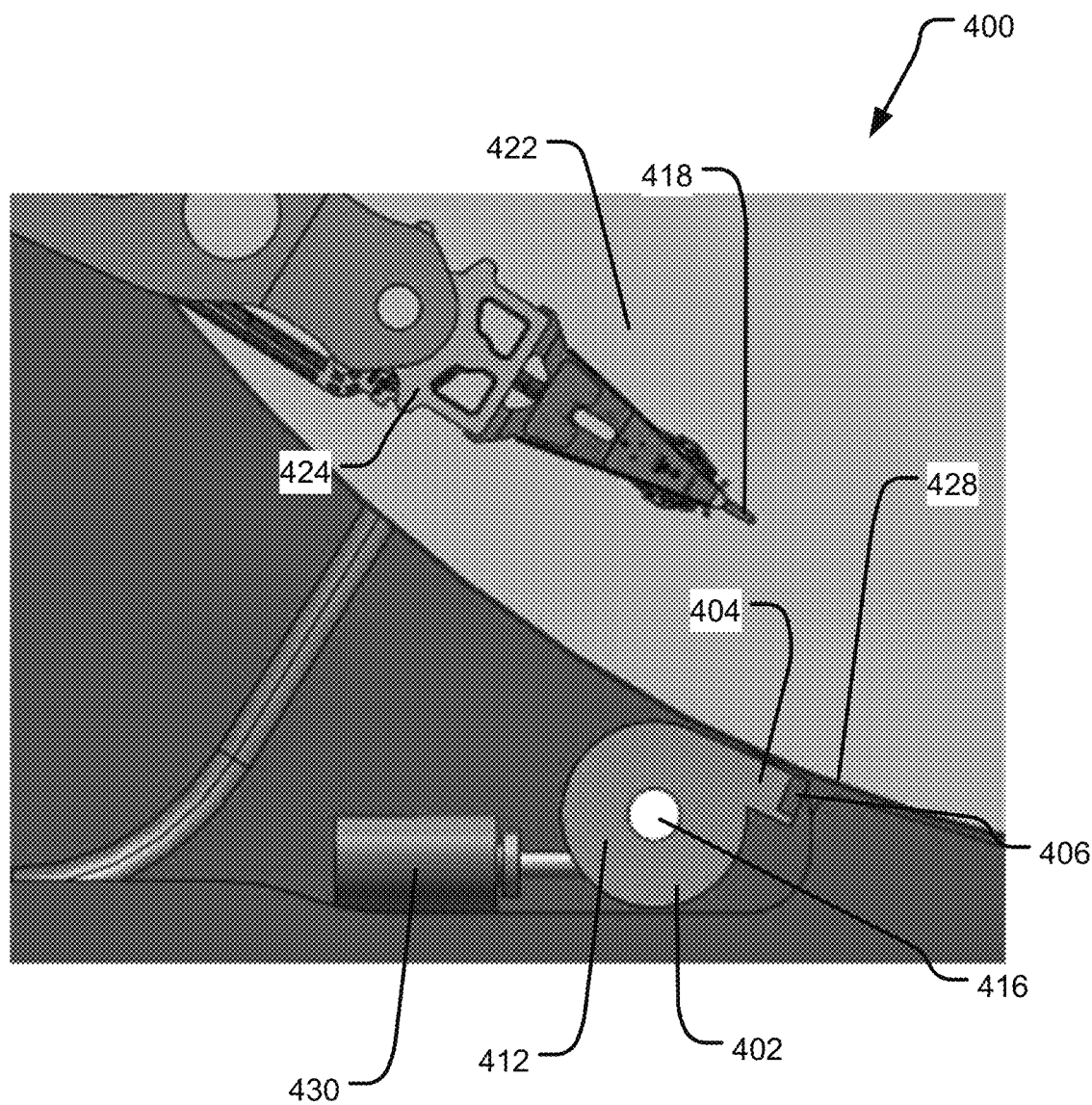
FIG. 12 depicts a top view of an example of a rotatable ramp assembly with actuator having been moved to a disengaged position relative to installed data storage disks with a head assembly into position relative to the data storage disks.
Figure 13:
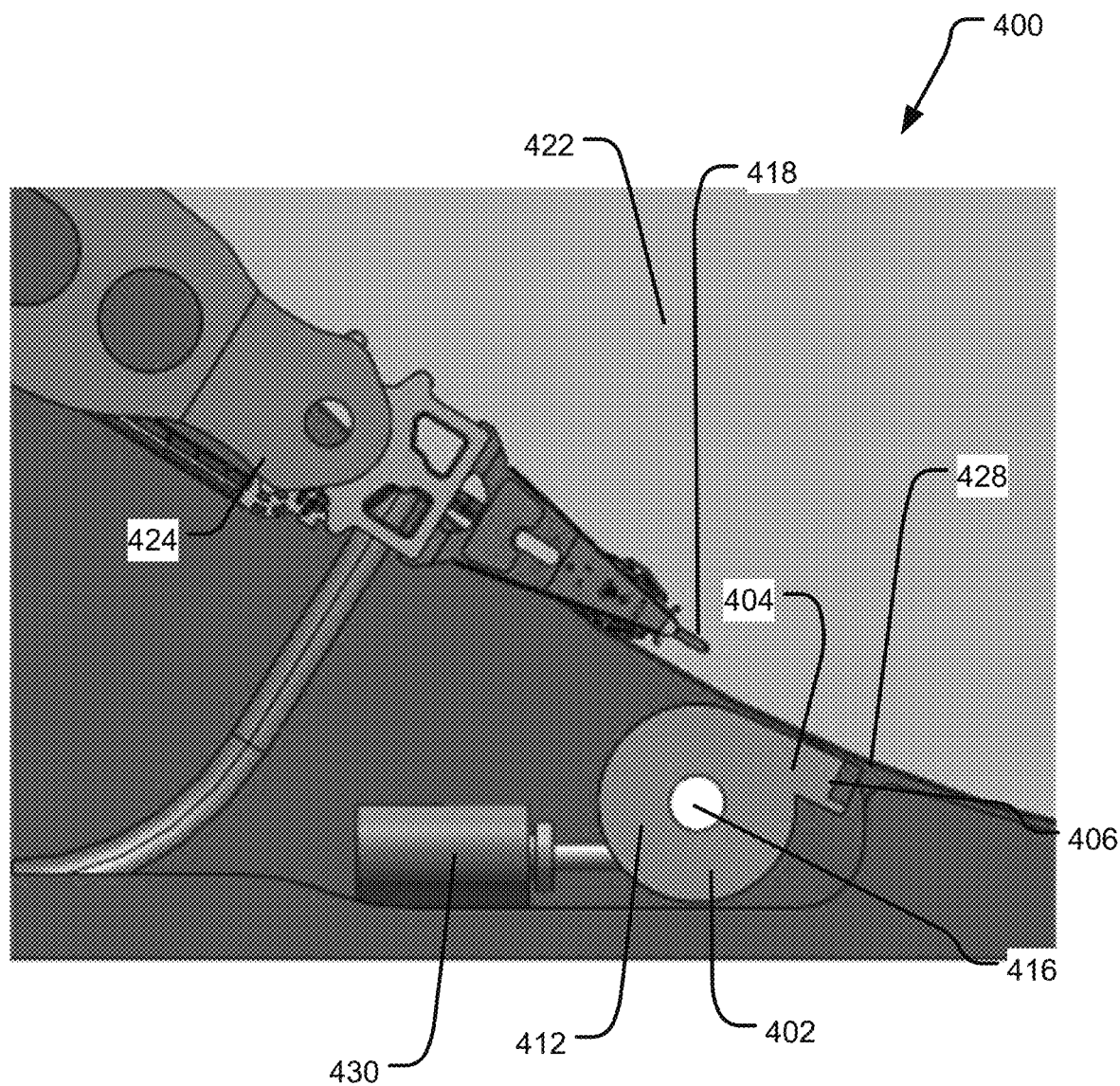
FIG. 13 depicts a top view of an example of a rotatable ramp assembly in a disengaged position such that a head assembly may access outer tracks of a data storage disk near the outer diameter of the data storage disk.

FIG. 11 shows the head assembly 418 having been moved by the head assembly actuator arm 424 such that the head assembly 418 moves along the ramp surface 406 of the ramp extension into position relative to the data storage disk 422. As such, in FIG. 12, the actuator 430 may move the rotatable ramp assembly 400 into a disengaged position such that the ramp extension 404 is disposed in non-overlying relation to the outer diameter 428 of the data storage disk 422. As such, in FIG. 13, the head assembly 418 may be moved to adjacent the outer diameter 428 of the data storage disk 422 to access data tracks adjacent to the outer diameter and that would otherwise be obscured if the ramp extension 404 was in the deployed position.

As briefly described above, in some contexts, it may be necessary to quickly move a head assembly from a position relative to the data storage disk to a parked position. For example, in the case of a detection of a mechanical disruption, power loss, or some other unforeseen and unplanned instance, it may be advantageous to rapidly move the head assembly to a parked position for protection of the data storage disk and/or head assembly. In this regard, a rotating ramp assembly according to the examples described herein may include an emergency actuator for rapid movement of the rotating ramp assembly from the disengaged position to the engaged position. The emergency actuator may be provided in addition to an actuator for movement of the rotating ramp assembly during normal (e.g., non-emergency) operations. In this regard, the emergency actuator may only be capable of moving the rotating ramp assembly from the disengaged position to the engaged position. In addition, the emergency actuator may move the rotating ramp assembly to the engaged position from the disengaged position more quickly than a normal actuator for normal movement between the disengaged and engaged positions. As an example, the emergency actuator may comprise a biasing member with a latch mechanism. Upon release of the latch mechanism, the rotating ramp assembly may move under influence of the biasing member to the engaged position.

Further still, in some scenarios, the head assembly may be moved to the head parking surface of the rotating ramp assembly without movement of the rotating ramp assembly to the engaged position. That is, the head assembly may be moved to the head parking surface while the rotating ramp assembly is in the disengaged position. To help facilitate movement of the head assembly to the head parking surface in an emergency park operation in which the rotatable ramp assembly cannot be moved into the engaged position, an emergency ramp may be provided by the rotating ramp assembly.

In one example, the emergency ramp may comprise an overhung portion of the rotating ramp assembly (e.g., a portion of the head parking surface) when the rotating ramp assembly is in the disengaged position. In this regard, even in the disengaged position, the emergency ramp of the rotating ramp assembly may slightly overhang an outer diameter of a data storage disk location. Alternatively or additionally, the emergency ramp may comprise an edge portion of the head parking surface. Whether the edge portion overhangs or is disposed in close proximity to the outer diameter of the data storage disk location in the disengaged position, the edge portion of the head parking surface may be configured to support a transition between the data storage disk and the head parking surface such as a beveled edge, truncated ramp, or other transition surface. One such example of an emergency ramp profile 326 is shown in FIG. 4. As can be appreciated, the emergency ramp profile 326 may generally be at a higher angle relative to the surface of the data storage disk 322 than the upper ramp surface 306 and lower ramp surface 310. However, the emergency ramp profile 326 may provide some guidance to the transition to the upper head parking surface 312 and the lower head parking surface 314, respectively. Thus, while potentially not as gradual a transition as provided by the ramp extension 304, in the case of an emergency parking operation in which a head assembly is to be rapidly moved to the head parking surface and not sufficient time is provided to move the rotating ramp surface to the engaged position, the head assembly may still be parked on the head parking surface by way of direct movement to the head parking surface via the emergency ramp without first traversing the ramp surface. Moreover, the emergency ramp profile 326 may be provided on the ramp body 302 at a location that is calibrated based on the rotation of the ramp body 302. For instance, while the ramp body 302 may not be close enough to the disk to facilitate emergency retraction of the head assembly 318/320 when in the disengaged position, the emergency ramp profile 326 may be provided at a point of the ramp body 302 that may come into position to facilitate an emergency retraction at some point in the rotation of the ramp body 302. This point may be less than the engaged position. As such, in an emergency situation, the ramp body 302 may begin to rotate such that at least the portion comprising the emergency ramp profile 326 comes into position to facilitate emergency retraction even if the ramp body 302 is not in the engaged position upon retraction of the head assembly 318/320 onto the ramp surface 310/312.

Figure 14:
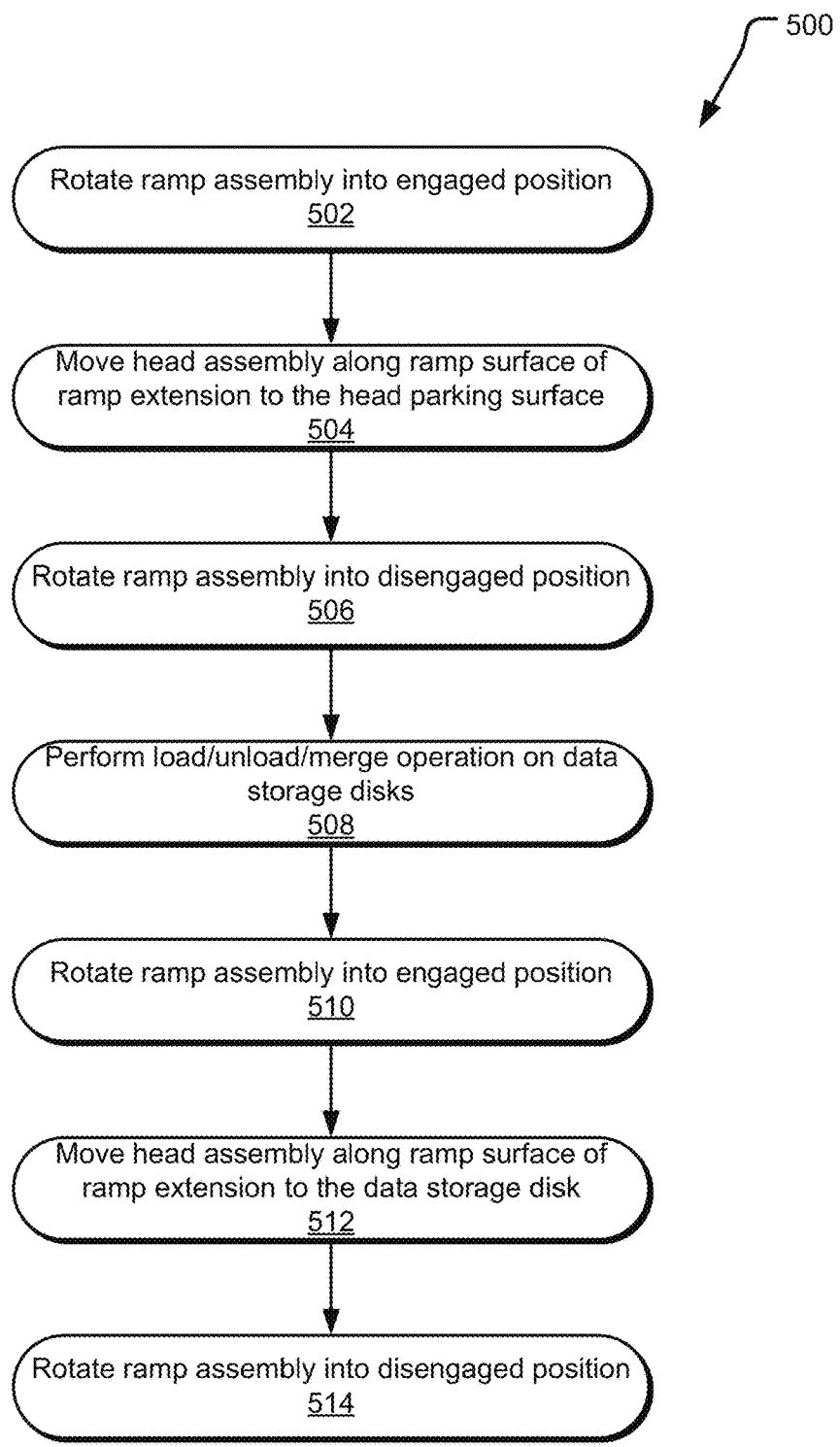
FIG. 14 depicts example operations for a disk drive assembly.

With further reference to FIG. 14, example operations 500 for a disk drive having a rotating ramp assembly as described herein are shown. The operations 500 may begin at any of the operations described, however, one progression of actions is discussed for illustration. For example, the operations may commence with a rotating operation 502 in which the rotating ramp assembly is rotated into an engaged position. The rotating operation 502 may include moving a ramp extension having a ramp surface into an overhanging position relative to an outer diameter of a data storage disk location of the disk drive. Of note, the rotating operation 502 may be conducted whether data storage disks are present in the disk drive or not.

In any regard, the operations 500 may also include a moving operation 504 in which a head assembly of the disk drive is moved along the ramp surface of the ramp extension in the engaged position to a head parking surface of the rotating ramp assembly. The moving operation 504 may include actuation of a head actuator to move a head assembly actuator arm for corresponding movement of the head assembly supported by the head assembly actuator arm.

The operations 500 may further include a rotating operation 506 in which the ramp assembly is rotated into the disengaged position. The rotating operation 506 may be performed while maintaining the head assembly at the head parking surface as the ramp assembly is rotated. That is, as the head parking surface is arcuate and extends about at least a portion of the ramp assembly, the head assembly may be maintained on the head parking surface as the rotating ramp assembly is rotated between the engaged and the disengaged position.

The operations 500 may also include a disk operation 508. The disk operation 508 may include performing a load, unload, and/or disk merge operation. That is, in an example, the disk operation 508 may include loading data storage disks into the disk drive in which no data storage disks were previously present. This may occur during initial manufacture of the disk or to replace data storage disks during operation of the disk drive. Alternatively, the disk operation 508 may include unloading or removing some or all of the data storage disks from the disk drive. Further still, the disk operation 508 may include a disk merge in which a portion of the data storage disks are added or removed from the disk drive. Also, the disk operation may include removal of a comb used to initially maintain position of the head assemblies prior to installation of data storage disks. In any regard, the disk operation 508 may be performed without interference from an overhanding ramp surface as the ramp surface has been moved into the disengaged position in the rotating operation 506.

Once the disk operation 508 is complete, the operations 500 may include a rotating operation 510 in which the ramp assembly is rotated into the engaged position such that the ramp extension and the ramp surface are disposed in overhanging relation to the outer diameter of the data storage disk location of the disk drive. A moving operation 512 may be performed to move the head assembly along the ramp surface of the ramp extension into position relative to a data storage disk location. A rotating operation 514 may be provided to move the rotating ramp assembly into the disengaged position. In this regard, if the head assembly is provided relative to data storage disks, the head assembly may access data tracks near the outer diameter of the data storage disk without interference from the ramp extension and/or ramp surface, which is in the disengaged position.

One general aspect of the present disclosure comprises a disk drive data storage system. The system includes a data storage disk location having an outer diameter. The system also includes a rotatable ramp assembly that is rotatable about a ramp assembly axis between an engaged position and a disengaged position relative to the data storage disk location. The system also includes a ramp extension extending tangentially from the rotatable ramp assembly and comprising a ramp surface. The ramp extension extends from the rotatable ramp assembly beyond the outer diameter to dispose the ramp surface in overlying relation relative to the data storage disk location when the rotatable ramp assembly is in the engaged position. The ramp extension is disposed without extending beyond the outer diameter such that the ramp surface is in non-overlying relation relative to the data storage disk location when the rotatable ramp assembly is in the disengaged position. The system also includes a head parking surface extending annularly about at least a portion of the rotatable ramp assembly to supportively engage a head assembly of the disk storage drive during rotation between the engaged position and the disengaged position.

Implementations may include one or more of the following features. For example, the system may also include an actuator for imparting rotation of the rotatable ramp assembly between the engaged position and the disengaged position. The actuator may include at least one of a shape memory alloy, a motor, a solenoid, or a bimetallic material. The system also includes a head actuator for movement of the head assembly relative to the data storage disk location. In an example, the head actuator may be engaged with a linear rail for linear movement of the head assembly in a zero skew drive.

In an example, the system also includes at least one data storage disk in the data storage disk location. The at least one data storage disk may be removeable from the drive when the rotatable ramp assembly is in the disengaged position. In an example, at least one data storage disk is capable of being installed to the drive when the rotatable ramp assembly is in the disengaged position.

In an example, the rotatable ramp assembly comprises an emergency ramp that is disposed relative to the data storage disk when the rotatable ramp assembly is in the disengaged position to facilitate an emergency park operation without movement of the rotatable ramp assembly into the engaged position. The emergency ramp may be distinct from the ramp extension. In addition, the emergency ramp may be disposed on the rotatable ramp assembly at a location between the ramp extension and a portion of the rotatable ramp assembly adjacent to the data storage disk location when the rotatable ramp assembly is in the disengaged position.

Another general aspect of the present disclosure includes a method for operation of a disk drive data storage system. The method includes moving a head assembly along a ramp surface of a rotatable ramp assembly to a head parking surface extending annularly about at least a portion of the rotatable ramp assembly to supportively engage the head assembly when the rotatable ramp assembly is in an engaged position in which a ramp extension comprising the ramp surface extending tangentially from the rotatable ramp assembly is disposed in overlying relation relative to an outer diameter of a data storage disk location of the disk drive data storage system. The method also includes rotating the rotatable ramp assembly from the engaged position to a disengaged position in which the ramp extension does not extend beyond the outer diameter such that the ramp surface is in non-overlying relation relative to the data storage disk location, wherein the head assembly is maintained on the head parking surface during the rotating.

Implementations may include one or more of the following features. For example, an actuator may be engaged with the rotatable ramp assembly for imparting rotation of the rotatable ramp assembly between the engaged position and the disengaged position. The actuator may include at least one of a shape memory alloy, a motor, a solenoid, or a bimetallic material. In an example, the head assembly is engaged by a head actuator for the moving of the head assembly relative to the data storage disk location. The head actuator may be engaged with a linear rail for linear movement of the head assembly in a zero skew drive.

In an example, the method may also include installing at least one data storage disk in the data storage disk location when the rotatable ramp assembly is in the disengaged position. The method may further include removing at least one data storage disk from the data storage disk location when the rotatable ramp assembly is in the disengaged position.

In an example, the method may include performing an emergency park operation in which the head assembly is moved to the head parking surface along an emergency ramp that is disposed relative to the data storage disk when the rotatable ramp assembly is in the disengaged position without movement of the ramp extension to the engaged position. The emergency ramp may be distinct from the ramp extension.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A disk drive data storage system, comprising:
a data storage disk location having an outer diameter;
a rotatable ramp assembly that is rotatable about a ramp assembly axis between an engaged position and a disengaged position relative to the data storage disk location;
a ramp extension extending tangentially from the rotatable ramp assembly and comprising a ramp surface, wherein the ramp extension extends from the rotatable ramp assembly beyond the outer diameter to dispose the ramp surface in overlying relation relative to the data storage disk location when the rotatable ramp assembly is in the engaged position, and wherein the ramp extension is disposed without extending beyond the outer diameter such that the ramp surface is in non-overlying relation relative to the data storage disk location when the rotatable ramp assembly is in the disengaged position; and
a head parking surface extending annularly about at least a portion of the rotatable ramp assembly to supportively engage a head assembly of the disk storage drive during rotation between the engaged position and the disengaged position.

2. The system of claim 1, further comprising:
an actuator for imparting rotation of the rotatable ramp assembly between the engaged position and the disengaged position.

3. The system of claim 2, wherein the actuator comprises at least one of a shape memory alloy, a motor, a solenoid, or a bimetallic material.

4. The system of claim 1, further comprising:
a head actuator for movement of the head assembly relative to the data storage disk location.

5. The system of claim 4, wherein the head actuator is engaged with a linear rail for linear movement of the head assembly in a zero skew drive.

6. The system of claim 1, further comprising:
at least one data storage disk in the data storage disk location.

7. The system of claim 6, wherein the at least one data storage disk is removeable from the drive when the rotatable ramp assembly is in the disengaged position.

8. The system of claim 7, wherein at least one data storage disk is capable of being installed to the drive when the rotatable ramp assembly is in the disengaged position.

9. The system of claim 1, wherein the rotatable ramp assembly comprises an emergency ramp that is disposed relative to the data storage disk when the rotatable ramp assembly is in the disengaged position to facilitate an emergency park operation without movement of the rotatable ramp assembly into the engaged position.

10. The system of claim 9, wherein the emergency ramp comprises an edge portion of the head parking surface that is distinct from the ramp extension.

11. The system of claim 10, wherein the emergency ramp is disposed on the rotatable ramp assembly at a location between the ramp extension and a portion of the rotatable ramp assembly adjacent to the data storage disk location when the rotatable ramp assembly is in the disengaged position.

12. The system of claim 1, wherein the head assembly is supported by the head parking surface when the rotatable ramp assembly is in the engaged position and the disengaged position.

13. A method for operation of a disk drive data storage system, comprising:
- moving a head assembly along a ramp surface of a rotatable ramp assembly to a head parking surface extending annularly about at least a portion of the rotatable ramp assembly to supportively engage the head assembly when the rotatable ramp assembly is in an engaged position in which a ramp extension comprising the ramp surface extending tangentially from the rotatable ramp assembly is disposed in overlying relation relative to an outer diameter of a data storage disk location of the disk drive data storage system; and
- rotating the rotatable ramp assembly from the engaged position to a disengaged position in which the ramp extension does not extend beyond the outer diameter such that the ramp surface is in non-overlying relation relative to the data storage disk location, wherein the head assembly is maintained on the head parking surface during the rotating.

14. The method of claim 13, further comprising:
- supporting the head assembly by the head parking surface when the rotatable ramp assembly is in the engaged position and the disengaged position.

15. The method of claim 13, wherein an actuator is engaged with the rotatable ramp assembly for imparting rotation of the rotatable ramp assembly between the engaged position and the disengaged position.

16. The method of claim 15, wherein the actuator comprises at least one of a shape memory alloy, a motor, a solenoid, or a bimetallic material.

17. The method of claim 15, wherein the head assembly is engaged by a head actuator for the moving of the head assembly relative to the data storage disk location.

18. The method of claim 17, wherein the head actuator is engaged with a linear rail for linear movement of the head assembly in a zero skew drive.

19. The method of claim 13, further comprising:
- installing at least one data storage disk in the data storage disk location when the rotatable ramp assembly is in the disengaged position.

20. The method of claim 19, further comprising:
- removing at least one data storage disk from the data storage disk location when the rotatable ramp assembly is in the disengaged position.

21. The method of claim 13, further comprising:
- performing an emergency park operation in which the head assembly is moved to the head parking surface along an emergency ramp that is disposed relative to the data storage disk when the rotatable ramp assembly is in the disengaged position without movement of the ramp extension to the engaged position.

22. The method of claim 21, wherein the emergency ramp comprises an edge portion of the head parking surface that is distinct from the ramp extension.

* * * * *